United States Patent [19]

Kosaka et al.

[11] Patent Number: 5,467,003
[45] Date of Patent: Nov. 14, 1995

[54] CONTROL METHOD AND CONTROL APPARATUS FOR A ROBOT WITH SENSOR

[75] Inventors: Tetsuya Kosaka; Eiichi Kobayashi, both of Oshino, Japan

[73] Assignee: Fanuc Ltd., Minamitsuru

[21] Appl. No.: 367,218

[22] PCT Filed: May 11, 1994

[86] PCT No.: PCT/JP94/00762

§ 371 Date: Jan. 12, 1995

§ 102(e) Date: Jan. 12, 1995

[87] PCT Pub. No.: WO94/27199

PCT Pub. Date: Nov. 24, 1994

[30] Foreign Application Priority Data

May 12, 1993 [JP] Japan ..................... 5-132327

[51] Int. Cl.⁶ .................................... G05B 19/00
[52] U.S. Cl. .................. 318/568.13; 318/571; 318/572; 318/573; 364/474.29; 364/474.30
[58] Field of Search ..................... 318/560–646; 364/474.01–474.33; 901/44–50; 219/69.12, 69.18, 69.17

[56] References Cited

U.S. PATENT DOCUMENTS

| 4,575,791 | 3/1986 | Schwefel ................. 318/570 X |
| 4,689,756 | 8/1987 | Koyama et al. ............. 318/573 |
| 4,700,314 | 10/1987 | Kinoshita ................ 364/475 |
| 4,755,927 | 7/1988 | Kishi et al. ............. 318/568 X |
| 4,833,381 | 5/1989 | Taft et al. .............. 318/577 |
| 4,949,271 | 8/1990 | Seki et al. ............. 364/474.29 |
| 4,961,150 | 10/1990 | Seki et al. ............. 318/573 X |
| 5,072,088 | 12/1991 | Watanabe ............... 364/474.29 |
| 5,204,599 | 4/1993 | Hohn .................. 318/571 |
| 5,210,697 | 5/1993 | Kawanabe .............. 364/474.35 |
| 5,383,131 | 1/1995 | Itamoto et al. ......... 364/474.29 |

FOREIGN PATENT DOCUMENTS

| 61-253508 | 11/1986 | Japan . |
| 1-1066107 | 4/1989 | Japan . |
| 2-235112 | 9/1990 | Japan . |

*Primary Examiner*—Paul Ip
*Attorney, Agent, or Firm*—Staas & Halsey

[57] ABSTRACT

A control method and a control apparatus for a robot, in which an operation line position is detected by a sensor, and real-time tracking of the operation line is performed by correcting a taught path with the use of an output signal from the sensor. The weld line position in a region on the travel direction side is sensed by the sensor supported by a robot hand to obtain the position data of sensed point kSm. After the sensed data is converted into coordinate data s(k, m) of a work coordinate system, processing is performed by using data of taught path segment PkPk+1 to which the sensed point kSm belongs. The processed data is stored in a buffer memory of ring memory type together with the coordinate data of the sensed point. The necessary data is read from the buffer memory just before the execution of tracking, to determine the tracking target point in a short period of time. The correction amount of interpolation point or taught point is calculated, and a control output for each axis is generated and sent to a servo control system to move the robot towards the tracking target point.

10 Claims, 6 Drawing Sheets

| | COLUMN 1 | COLUMN 2 | COLUMN 3 | COLUMN 4 | COLUMN 5 |
|---|---|---|---|---|---|
| OLD ↑ | S (1, 1) | η (1, 1) | Λ (1, 1) | * | * |
| | S (1, 1) | η (1, 1) | Λ (1, 1) | * | * |
| | S (1, 1) | η (1, 1) | Λ (1, 1) | * | * |
| | . . . . | . . . . | . . . . | * | * |
| | . . . . | . . . . | . . . . | * | * |
| | S (1, q-1) | η (1, q-1) | Λ (1, q-1) | * | * |
| | S (1, q) | η (1, q) | Λ (1, q) | * | * |
| ↓ NEW | * | * | * | * | * |
| | * | * | * | * | * |
| | * | * | * | * | * |

FIG. 4

| | COLUMN 1 | COLUMN 2 | COLUMN 3 | COLUMN 4 | COLUMN 5 |
|---|---|---|---|---|---|
| OLD ↑ | S (1, q-1) | η (1, q-1) | Λ (1, q-1) | * | * |
| | S (1, q) | η (1, q) | Λ (1, q) | * | * |
| | . . . . | . . . . | . . . . | * | * |
| | . . . . | . . . . | . . . . | * | * |
| | . . . . | . . . . | . . . . | * | * |
| | S (1, r-1) | η (1, r-1) | Λ (1, r-1) | * | * |
| | S (1, r) | η (1, r) | Λ (1, r) | * | * |
| | S (2, 1) | * | * | η (2, 1) | Λ (2, 1) |
| | S (2, 2) | * | * | η (2, 2) | Λ (2, 2) |
| ↓ NEW | S (2, 3) | * | * | η (2, 3) | Λ (2, 3) |

CONTROL METHOD AND CONTROL APPARATUS FOR A ROBOT WITH SENSOR

TECHNICAL FIELD

The present invention relates to a control method and a control unit for an industrial robot which detects an operation line position by using a sensor and corrects a taught path by using an output signal from the sensor to perform real-time tracking of the operation line.

BACKGROUND ART

Conventionally, in performing various operations such as welding, painting, cleaning, energy beam radiation and machining using an industrial robot, a position of operation line is detected by a sensor supported on a robot hand and a path taught through on-line or off-line is corrected based on a signal from the sensor, to control the robot so that the actual tool path conforms with the ideal path. The work lines include a characteristic line capable of being identified by a sensor such as a weld line formed on a workpiece (for example, a boundary line formed by the difference in height between two workpieces to be welded) formed on a workpiece and a contour line of workpiece. The aforementioned sensor may be of a type such that the operation line position is detected by deflecting laser beam., As a typical example of the application of such control method, the real-time tracking of weld line is known. The conventional procedure of real-time tracking control includes the following steps: first, the sensed data representing the weld line is acquired by the sensor, the acquired sensed data is converted to coordinate data on the coordinate system set on the robot, and the data converted into coordinate data is stored in memory means. When the tool tip point almost has approached the sensing position of a sensor, the coordinate data is read, and it is compared with the position data (interpolation point position data) of corresponding taught path segment to calculate an amount of correction Δ.

In the state in which the tool tip point has reached a position close to the subsequent taught point, the sensing region of the sensor has already advanced beyond the taught point, and has entered a region in which the weld line corresponding to the next taught path segment is present. At this point, to execute the above calculation processing by reading the data stored in the memory means, the time available for reading position data of the next taught point and for the subsequent interpolating calculation processing (calculation processing to determine the data of the next taught path segment) is not ample enough.

That is, when the tool tip point approaches the weld line corresponding to the next taught path segment, in order to determine the amount of position correction Δ, it is necessary to calculate many interpolation point position data of the next taught path segment and to perform, in advance, processing for providing correspondence to the data read from the memory means. Therefore, the total processing load including the calculation of position correction amount Δ following the above processing and the calculation processing of target position based on the position correction Δ becomes very high, so that it is difficult to issue the target position command timely before the tool tip point reaches the next taught point in order to control the robot so that the tool tip point is surely ready for tracking.

The above-described problem of the prior art is not limited to the welding work in which the weld line is tracked, but is commonly encountered when work is done in a fashion that a robot is moved while correcting the target position with respect to the taught path by using the result of sensing within the region in the tool travel direction.

DISCLOSURE OF THE INVENTION

An object of the present invention is to achieve accurate tool path correction by effectively using sensed data obtained by a sensor in a region beyond a taught path segment to which the current position of tool tip point belongs. In other words, the present invention is intended to achieve accurate tool position correction even in a region near each taught point for a robot with a sensor which is used, for example, when welding work is executed while tracking weld line.

The robot control method of the present invention includes steps of: obtaining sensed data by detecting an operation line position in a region on the travel direction side of a tool supported by a robot; converting said sensed data into coordinate data representing said operation line position on a coordinate system set in the robot; obtaining processed data by processing said coordinate data converted in said step, using data of a taught path segment relating to said region for detection among path data taught in advance; storing said processed data obtained in said step in memory means; reading at least part of the data stored in said step and preparing correction data for correcting said taught path, when said tool approaches a point just before said detected operation line position; and correcting said teaching path data based on said correction data to generate a control output for moving said tool toward a target position.

The processed data is obtained by executing at least part of calculation required for preparing the correction data, based on the coordinate data. The processed data includes a passage factor of a point at which a perpendicular drawn from a point representing the operation line position to a straight line defined by the data of the taught path segment intersects the straight line within the taught path segment, and data representing a straight line connecting two adjacent points representing the operation line position.

The present invention further provides a control apparatus for executing the above-described robot control method.

BRIEF DESCRIPTION OF THE INVENTION

BEST MODE FOR CARRYING OUT THE INVENTION

First, a general-procedure of real-time tracking will be described with reference to FIG. 1. The general procedure comprises to detect a weld line by using a sensor, and to execute real-time tracking while correcting the taught path by using the data obtained by sensor so that the taught path agrees with the tracking line.

Figure 1:
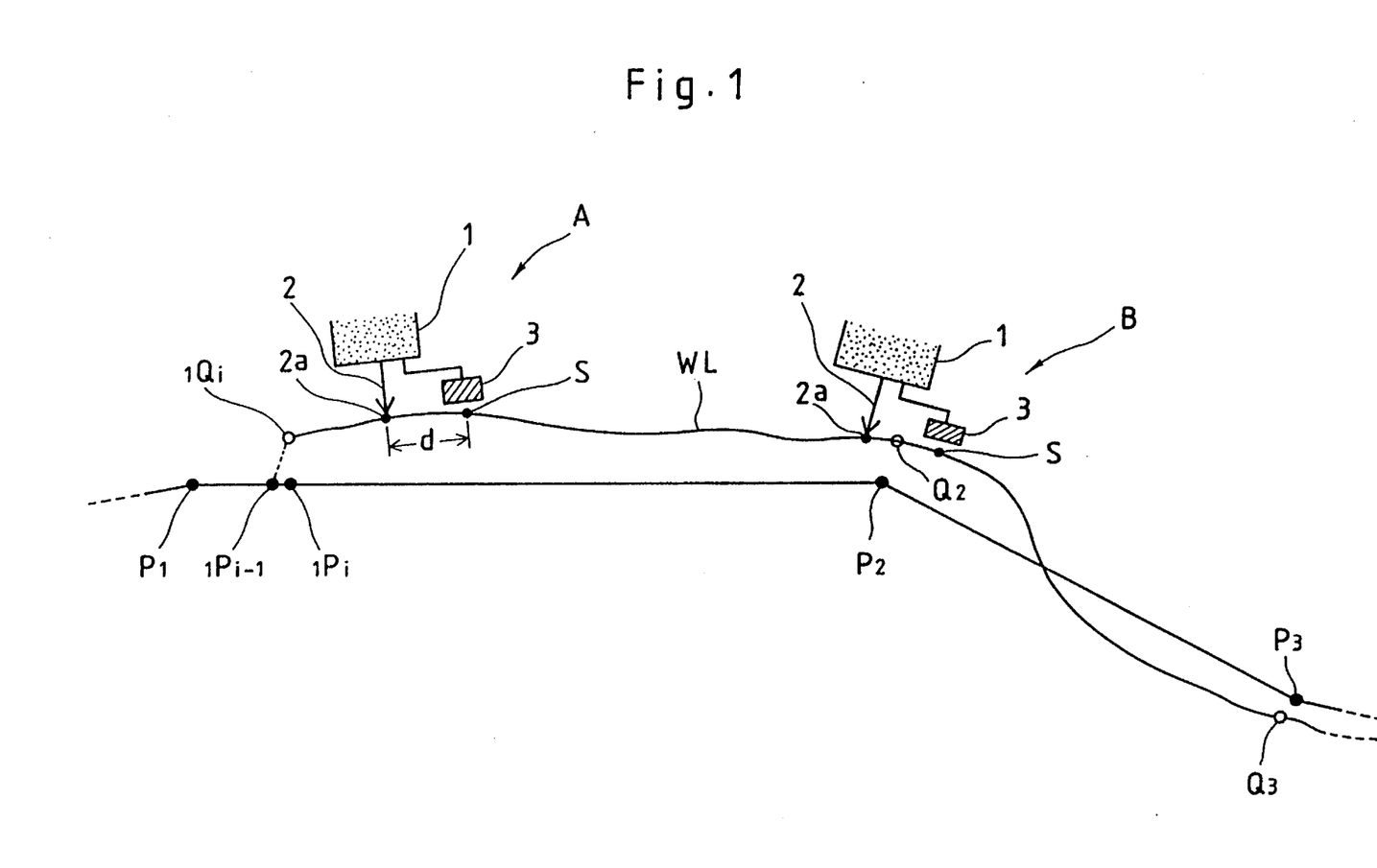
FIG. 1 is a view illustrating the outline of real-time tracking control of Weld line.

Referring to FIG. 1, the path connecting the taught points P1, P2, P3 . . . forms a taught path, and this taught path consists of taught path segments P1P2, P2P3, . . . . The taught path segment is formed by a straight line or a circular arc; in this example, it is formed by a straight line. A weld line WL extends from a point neap the i-th interpolation point 1Pi on the taught path segment P1P2, and an ideal tracking line is formed corresponding to this weld line. Point 1Qi is the start point of tracking line, which is the first tracking target point, and points Q2, Q3, . . . are tracking target points corresponding to the taught points P2, P3, . . .

The tip portion of a robot hand 1 carries a welding torch 2 as a tool. A sensor 3 is installed at a position so that the region located ahead by a distance d in the tool travel direction from the tip point 2a of the welding torch 2 can be sensed. Normally, the value of distance d is set at about several millimeters to several tens millimeters.

As the procedure for executing tracking while sensing the weld line WL by using the sensor 3 and correcting the taught path, the procedure consisting of the following repetitive steps is possible.

(i) The sensed data representing the weld line position is acquired by the sensor 3.

(ii) The sensed data thus acquired is converted into the data represented on the coordinate system set on the robot by using the current position data of tool at the sensing time.

(iii) The converted data is stored in a buffer memory (set in a RAM memory) in a robot controller as the position correcting data.

(iv) When the tool tip point (tool point) 2a has almost reached the position to be sensed by the sensor 3, the position correcting data is read and compared with the position data (interpolation point position data) of corresponding taught path segment to calculate a correction amount Δ.

(v) The calculated correction amount Δ is added to the position data (position data of corresponding interpolation point) on the taught path segment; based on this, the command value for each axis of robot is determined by the inverse kinematics calculation; and by supplying a position pulse signal to the servo control system, the tool position is controlled so that the the tool tip point 2a coincides with the weld line.

With such a tracking method, when the tool tip point 2a is at a position away from the next taught point P2 as indicated by A in FIG. 1, there occurs no problem. More specifically, the position data of taught points P1 and P2 have already been read, so that the calculation for correction processing can be started from the state in which the data of taught path segment P1P2, such as the interpolation point position data, has already been calculated, as the tool advances. Therefore, there is no problem such that the processing of the above steps (i) to-(v) will not able to follow the tool movement to hinder the progress of tracking.

Considering the tracking control at the time when the tool tip point 2a has reached the position indicated by B in FIG. 1, with the above method, it will be found that the processing for tracking cannot be carried out smoothly, so that tracking cannot be executed smoothly either. The reason for this is as described below.

At position B, the tool tip point 2a of robot has advanced until a position falling short, by distance d, of the following taught point P2, and the sensing region has already advanced beyond the taught point P2 to enter the weld line region corresponding to the next taught path segment P2P3. Until the sensed data acquired by sensing is converted into the coordinate data on the coordinate system set on the robot, and the converted data is stored in the buffer memory as the position correcting data, the processing is performed under the same condition as the processing for position A; therefore, there will be no problem. However, when performing the processing of the above step (iv) in which the stored position correcting data is read to start tracking, the reading of position data of the next taught point P3 and the subsequent processing for interpolating calculation (calculation processing for deriving the data of the taught path segment P2P3) cannot be performed with an ample time left. Thus, it is difficult to perform the calculation processing for carrying out exact tracking without delay since the tool tip point 2a gets a considerable distance in a portion of the taught path segment P2P3.

Considering the processing of the above item (iv) in detail, in order to determine the position correction amount Δ, it is necessary to calculate data of many interpolation points based on the position data of the taught path segment P2P3 and make the correspondence between the interpolation point data and the position correction data read from the buffer memory before the calculation of position correction amount Δ.

Therefore, in the method in which the position correction processing based on the new taught path segment is started when the region in which tracking is to be performed is reaching, the total processing load including the calculation of position correction A and the processing of the steps (i) to (v) becomes extremely heavy. It is difficult to control the robot so that the target position command is issued timely with sufficient time margin for the tracking in the near region beyond the next taught point before the tool tip point 2a of robot reaches the next taught point, and the robot is reliably ready for tracking before the tool tip point 2a reaches the near region.

Figure 2:
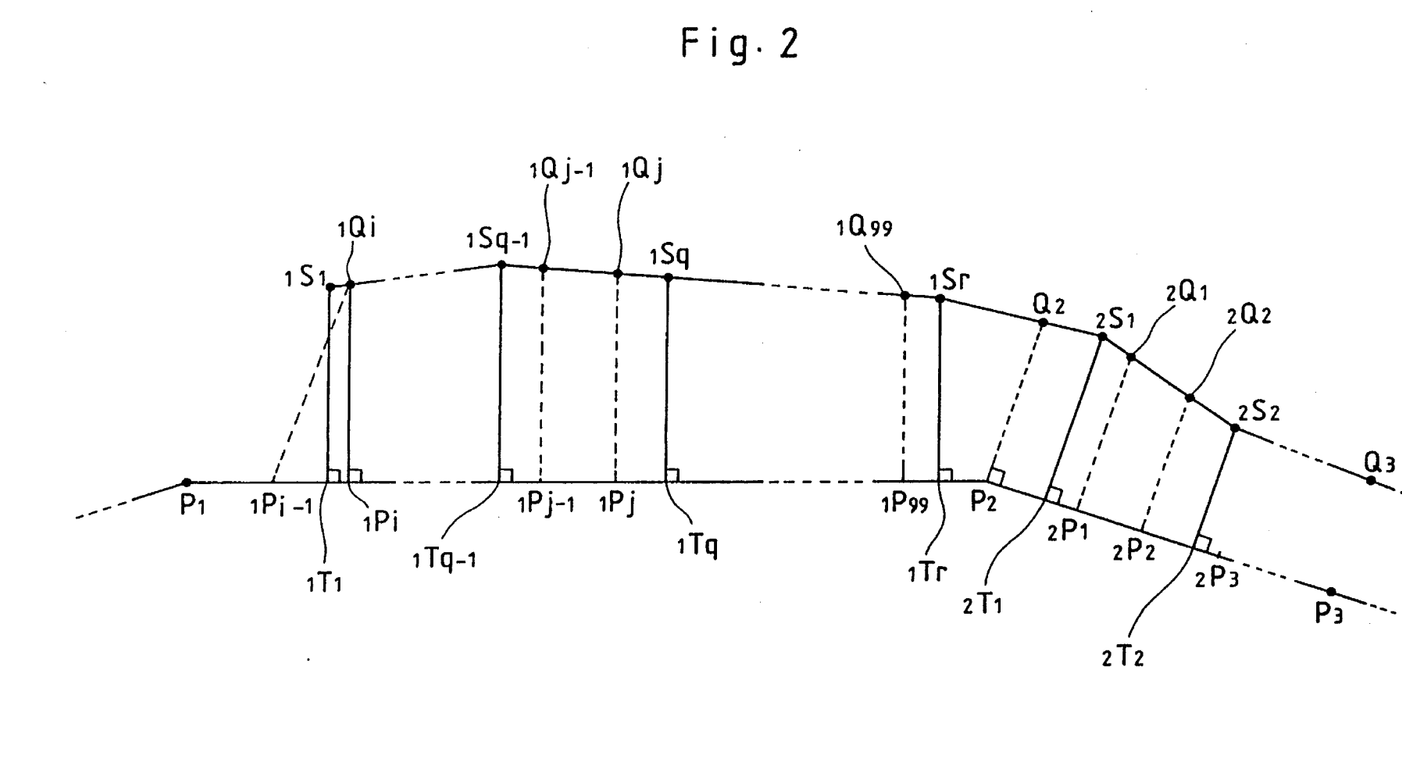
FIG. 2 is a view illustrating the principle in which the correction of tool position is achieved by a method of the present invention.
Figure 3:
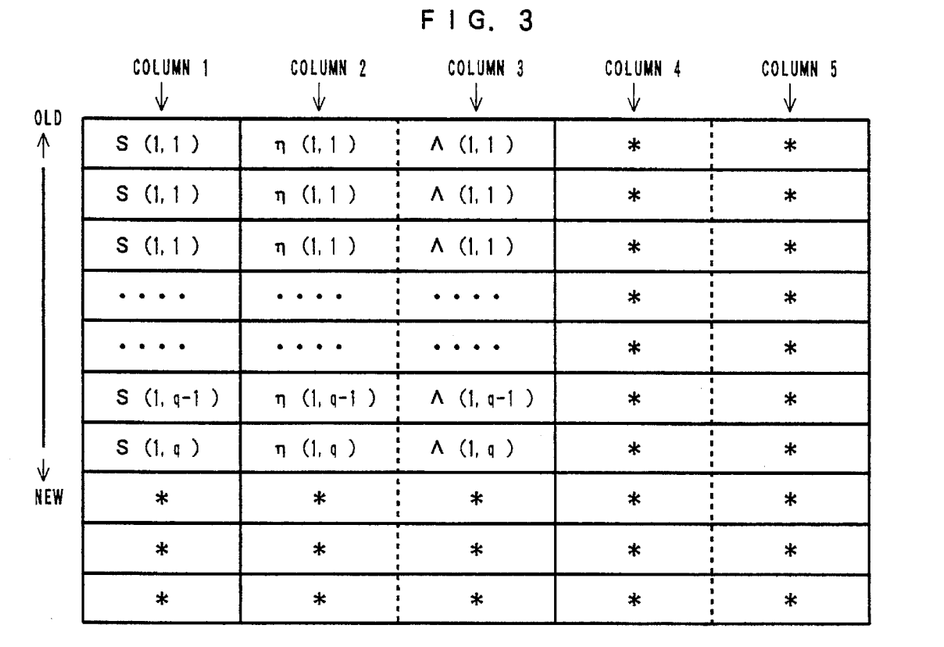
FIG. 3 is a view showing the content of buffer memory, which can be used in a control unit of the present invention.
Figure 4:
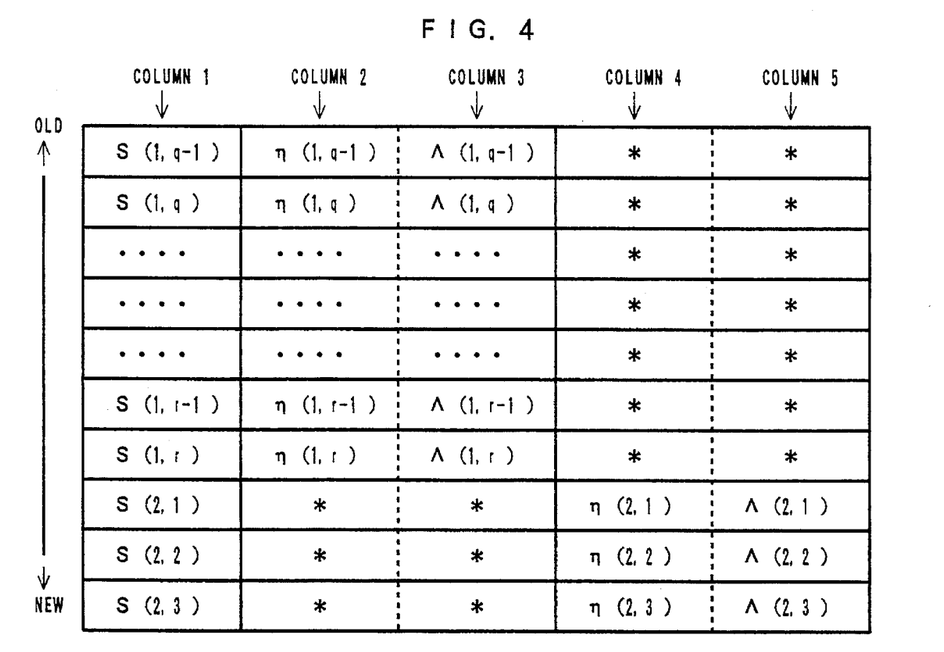
FIG. 4 is a view showing the content of buffer. memory after the tool travels from the state shown in FIG. 3.

Next, the principle for achieving the tool position correction by using a control method and a control unit for a robot with a sensor in accordance with the present invention will be described with reference to FIGS. 1 to 4. FIG. 2 is a partially enlarged view of the region corresponding to positions A and B, schematically showing the relationship between the taught path and the weld line to be sensed. FIGS. 3 and 4 schematically show the function of buffer memory which can be used in the control unit of the present invention.

First, the relationship between the interpolation points on the taught path and the sensing points and the outline of the method for determining the tracking target points are described by enumerating the meaning of symbols used in FIG. 2. In FIG. 2, the robot hand 1, the tool tip point 2, and the sensor 3 are omitted.

P1, P2, P3: taught points. Taught path segments are formed by the lines connecting taught points. In general, the taught path segment is formed by a straight line or a circular arc. Here, it is represented by a straight line.

1Pi-1, 1Pi, 1Pj-1, 1Pj, 1P99: interpolation points on the taught path segments P1P2. kPm represents the m-th interpolation point on the taught path segment PkPk+1. Here, each taught path segment is divided into 100 parts, and a total of 99 interpolation points are defined.

2P1, 2P2, 2P3: interpolation points on the taught path segment P2P2.

1S1, 1Sq-1, 1Sq, 1Sr: points detected by the sensing of weld line segment corresponding to the taught path segment P1P2 (sensing point). kSm is the m-th sensing point on the weld line segment corresponding to the taught path segment PkPk+1. Here, an ordinary case where the number of sensing points on each segment is considerably smaller than the number of interpolation point is assumed. Therefore, if the last sensing point on the segment is represented by 1Sr, the relation of r <99 is established. Considering that the interval between sensing points is nearly equal, the interval between sensing points is larger than the interval between interpolation points as shown in FIG. 2.

2S1, 2S2: sensing points detected on the weld line segment corresponding to the taught path segment P2P3.

1T1, 1Tq-1, 1Tq, 1Tr: end points of the perpendiculars from the sensing points 1S1, 1Sq-1, 1Sq, 1Sr to the taught path segment P1P2. Normally, the interval between the end points of perpendiculars is nearly equal to the interval between the sensing points. Therefore, at least one interpolation point is present between the end points of perpendiculars as shown in FIG. 2.

2T1, 2T2: end points of perpendicular from the sensing point 2S1, 2S2 detected on the weld line segment corresponding to the taught path segment P2P3 to the line segment P2P3.

1Qi-1, 1Qi, 1Qj-1, 1Qj, 1Q99: tracking target points corresponding to the interpolation points 1Pi-1, 1Pi, 1Pj-1, 1Pj, 1P99 on the taught path segment P1P2. Each tracking target point is determined from one-to-one correspondence relation, as the position correction point, with respect to each interpolation point kPm. Here, a rule is used in which the point to which the perpendicular drawn to the interpolation point kPm intersects the line between the sensing points is defined as the tracking target point kQm. As another possible rule, for example, there is one such that the sensing point itself is defined as the tracking target point corresponding to the interpolation point for the interpolation point closest to each sensing point, and the equally interpolated point on the sensing point segment corresponding to the interpolation points on both sides, which already have correspondences, is defined as the tracking target point for the interpolation point which does not have correspondence, thereby providing one-to-one correspondence between the tracking target points and all interpolation points. Either rule, when applied, will not limit the effect of the technical teachings of the present invention.

2Q1, 2Q2: tracking target points corresponding to the interpolation points 2P1, 2P2 on the taught path segment P2P3.

Q1, Q2, Q3; tracking target points defined corresponding to the taught points P1, P2, P3. By treating each taught point Pk as the 100 th interpolation point k-1P100 or the 0th interpolation point kP0, each tracking target point can be determined by a method based on the rule for determining the tracking target point for each interpolation point.

Next, the outline of procedure for executing tracking in accordance with the present invention will be described on the basis of the above description.

The sensing is started by the sensor 3 carried by the robot hand 1 at a suitable time around the time of start of tool movement. In the case shown in FIG. 2, the weld line is first detected in the forward region of the taught point P1 in the travel direction of the cutting tool. Therefore, until a point just before the interpolation point 1Pi corresponding to the first sensing point 1S1 is reached, the sensing function is not activated, and the tool movement following the taught path is executed by the ordinary method.

Specifically, the data of the taught points P1 and P2 are read just before the taught point P1 is reached, and processings such as the position data calculation of the interpolation points 1P1, 1P2, . . . , the calculation of target axis value, and the delivery of axis position command pulse are repeated successively to continue the tool movement.

When the first sensing point 1S1 is detected, the tool tip point 2a of robot is located at a position approximately distance d (see FIG. 1) away from point 1T1 in FIG. 2 to the left (opposite to the travel direction). The distance d is normally set at about several to several tens millimeters. Since this distance is adequately longer than the interval between the interpolation points, the position of the tool tip point 2a lies more leftward than the interpolation point 1Pi-1 in FIG. 2. Similarly, for the subsequent sensing points 1S2, 1S3, . . . , kSm, . . . , the position of tool tip point at the time of sensing may be considered to be on the nearer side than the sensing point by a distance corresponding to d.

Therefore, between the sensing time and the tracking execution time, there is a time for executing a considerable amount of data processing. The present invention is essentially characterized in that this time is utilized to process the sensed data and store it in the memory so that processed data can be read and used when the tool tip point 2a of robot has approached a position at which tracking is to be actually performed, and the position correction processing of the interpolation point corresponding to the tracking target position or the taught point can be performed with small amounts of data processing.

Next, the outline of an example of procedure for preparation and storage of processed data will be described with reference to FIGS. 3 and 4 in addition to FIGS. 1 and 2.

I. The sensor 3 detects the sensing point kSm, and the sensed data represented on the sensor coordinate system Σs is acquired.

II. The above sensed data is converted into the coordinate data on the work coordinate system Σw set on the robot. For this conversion processing, the data of the robot position (including "orientation") at the time of sensing of the above point kSm, and the data of correlation among the coordinate systems (work coordinate system Σm, tool coordinate system Σt, hand coordinate system Σh, etc.) set on the robot, and the data representing the correlation between each coordinate system and sensor coordinate system (matrix element data for simultaneous conversion matrix acquired in advance by calibration) can be utilized.

The coordinate data of the sensing point kSm converted as described above is represented by s(k,m)=(xs-km, ys-km, zs-km).

III. The position data t(k,m)=(xt-km, yt-km, zt-km) of point kTm is determined by using the above coordinate data s(k,m) and the data (straight line path or circular arc path data) of the taught path segment PkPk+1. The data of the taught path segment PkPk+1 is read at an earliest possible time before the tool tip point of robot passes the target point corresponding to each taught point Pk. That is to say, the data is read long enough before the tracking so as to be in time for the calculation of processed data, described below, not immediately before the tracking.

IV. The position data t(k,m)=(xt-km, yt-km, zt-km) of point kTm is converted into a taught path segment passage factor η(k, m) for the taught path segment PkPk+1.

V. Among the various data obtained in the above processes I to IV, the data required at the time of calculation of tracking target point is stored in the buffer memory. In this embodiment, the coordinate data s(k, m) of the sensing point and the taught path segment passage factor data η(k, m) obtained by the processing the former data are made correspond to each other and stored. The correspondence can be made through the selection of the data storage location in the buffer memory, as described later.

VI. If there is surplus capacity in the buffer memory, equation data representing line segment 1S2—1S2, 1S2–1S3, . . . , 1Sk-1-1Sk, . . . , 1Sr-1-1Sr, 1Sr-2S1, 2S1–2S2, . . . connecting the adjacent sensing points, or equation data Λ(1, 1), Λ(1, 2), . . . , Λ(k, m), . . . corrected by using a method such as the method of least squares can be prepared and added to the stored data. Thereupon, the tracking target point calculation processing is simplified, and the variations in-sensor position measurement is absorbed, thereby creating a favorable condition in achieving more desirable tracking path. As the content of Λ(k, m), for example, the parameter values α, β, γ, and c can be consider where the equation of line segment expressed in terms of the work coordinate system Σw are represented by αx+βy+γz+c=0.

For the data storage in the above processings V and VI, the buffer memory of a ring memory type is preferable. More particularly, each time the sensing is performed by the sensor 3 to prepare the coordinate data s(k, m) of the sensing point, the taught path segment passage factor η(k, m), which is the processed data thereof, and the equation data Λ(k, m), these data are stored successively into the ring memory having data storage columns 1 to 5 consisting of several tens lines each in the manner shown in FIGS. 3 and 4.

As shown in FIGS. 3 and 4, the data is stored in such a manner that the latest data is added to the end of the last written line. If all the lines are full, the first stored data (oldest data) is pushed out to be erased, and new data is written by moving up each data line one by one. For the use of columns, there is a rule that each time the corresponding taught path segment is renewed, the column in which data is to be written is changed. Therefore, for column 1, the data is written alternately in column 2, 3→ column 4, 5 → column 2, 3→ column 4, 5→. . . .

The latest stored data in FIG. 3 is the coordinate data relating to the sensing point 1Sq, and the latest stored data in FIG. 4 is the data relating to 2S3. The ring-type memory is formed by a RAM and can access any line of any column at any time.

The above-described procedure is carried out during tool movement (tracking). Therefore, the processings covering from sensing to data storage are repeated, and, on the other hand, the processings for tracking are performed successively in parallel with the above processing. The procedure will be described with reference to FIGS. 3 and 4.

First, the method for determining the first tracking target point 1Qi corresponding to the interpolation point 1Pi will be described, As described above, the processed data of the sensing point 1S1 has been stored in the buffer memory immediately after the first sensing point 1S1 has been detected, leaving a considerable time margin for the processing to be carried out immediately before the execution of tracking. More particularly, as shown in FIG. 2, the coordinate data s(1, 1) on the work coordinate system of the sensing point 1S1 is stored in the first line of the first column. In the first line of the column 2, the taught path segment passage factor η(1, 1) of point 1T1 corresponding to the sensing point 1S1 has been stored.

If the forward distance d of the sensing region is provided sufficiently longer than the interval between the adjacent sensing points, the coordinate data s(1, 2) of the second sensing point 1S2 can be obtained considerably earlier than the execution of tracking corresponding to the interpolation point 1Pi. Therefore, the data 1Λ1 representing the equation of line segment 1S1–1S2 and the taught path segment passage factor η(1, 2) of 1T2 are calculated by using the coordinate data s(1, 1) and s(1, 2), and the data can be stored in the second line of column 1 and the first line of column 3, respectively.

To calculate the position of the first tracking target point 1Qi, a simple calculation may be performed by using the stored data s(1, 1), s(1, 2), η(1, 1), η(1, 2) and 1Λ1. For example, as the specific numeral in the case shown in FIG. 2, here it is assumed that η(1, 1)=9.7% and η(1, 2)=11.2%. According to the above-described rule for setting the interpolation point, the taught path segment passage factor of the interpolation point 1P10 is 10.0%. Therefore, it is found that the interpolation point 1P10 is within the segment 1T1 1T2. That is to say, it is found that the interpolation point 1Pi corresponding to the first tracking target point 1Qi is the tenth taught point 1P10 on the taught path segment P1P2.

Therefore, considering the passage factor λ in the segment T to which the interpolation point 1P10 belongs, that is, the segment determined by two adjacent points 1T1 1T2, λ(1, 10)=(10.0–9.7)/(11.2–9.7)=⅕=0.2 can be obtained as the T segment passage factor of 1P10. Therefore, assuming that the first tracking target point 1Q10 is determined as shown in FIG. 2, the position of 1Q10 can be determined as follows by appropriately using the stored position data s(1, 1), s(1, 2), Λ(1, 1) of the sensing point 1S1, 1S2.

Using the position data s(1, 1), s(1, 2), a point which divides the interval between both points in the ratio of 1 to 4 (0.2:0.8) may be determined. Alternatively, if a function 1F1 representing a line segment having the start point/end point of position 1S1, 1S2 or the corrected points 1S1 and 1S2 (the sensing point data itself is sometimes corrected by the approximate function replacement processing etc. of the coordinate data of plural sensing points) is defined as Λ(1, 1), and this function is prepared in the form of function F(λ) of the passage factor A in the definition region, the position data of the tracking target point 1Q10 can be determined merely by substituting λ(1, 10)=0.2 into the function 1F1 and by making calculation for determining the function value.

Similarly, for another interpolation point 1Pj on the taught path segment P1P2, the position of the corresponding tracking point 1Qj can be determined by making a simple calculation using the data s(1, j), s(1, j+1), η(1, j), η(1, j+1), 1Λj which have already been stored in the memory or the function 1Fq-1[λ(1, j)] and the passage factor λ(1, j).

To determine the tracking target point Q2 for a new taught point P2, several methods as described below are possible. One method is to define the target point Q2 as the intersection of the perpendicular drawn from point P2 to the taught path segment P2P3 and the line segment 1Sr 2S1 as shown in FIG. 2. Point 1Sr is the last sensing point from which a perpendicular can be drawn to the taught path segment P1P2, and is also a point just before the first sensing point 2S1 from which a perpendicular can be drawn to the taught path segment P2P3.

Other methods are also possible. They include a method in which point Q2 is defined as the intersection of the perpendicular drawn from point P2 to the taught path segment P1P2 and the line segment 1Sr 2S1, a method in which point Q2 is defined by dividing the line segment 1Sr 2S1 in the ratio of distance 1Tr–P2 and distance P2–2T1, a method in which point Q2 is defined by extrapolating the line segment 1Q98 1Q99 by regarding point Q2 as 1Q100, and a method in which point Q2 is defined as the middle point of the line segment 1Q99 2Q1. The method to be used may be determined considering the nature of work, occurrence direction of path error, simplicity of calculation, etc.

Whatever method is used to define the tracking target point corresponding to the taught point, the amount of processing immediately before the tracking can be significantly reduced, as compared with the processing in which the calculation of new taught path segment P2P3 is started at this stage, by using the coordinate data $s(1, r)$ of the sensing point, the processed data $\eta(1, r)$, $\eta(2,1)$ and 1Δr, and the passage factor $\lambda(1, 99)$ or $\lambda(2, 1)$.

The method for determining the tracking target point 2Q1, 2Q2, ... for the interpolation point 2P1, 2P2, ... on a new taught path segment P2P3 is basically the same as the method for determining the tracking target point for the interpolation point on the old taught path segment P1P2. The basic feature of the present invention is that the processings from the time when the tool tip point 2 of robot is present in the region belonging to the old taught path segment P1P2 to the time when the data obtained by sensing is processed and the processed data is stored are finished for several interpolation points 2P1, 2P2, etc. (those corresponding to advanced distance d of sensing region) after the sensing region comes on a new taught path segment P2P3, including the calculation of the tracking point Q2 for the taught point P2 however.

The position data of the sensing point belonging to the new taught path segment P2P3 and the processed data are stored in columns 1, 4, and 5 as shown in FIG. 4. Necessary data is read from the buffer memory immediately before the execution of tracking to perform simple calculation, by which the position data of the tracking target point is determined.

If the tracking target position is determined by the above-described method, the correction amount Δ (generally, three-dimensional vector quantity) for the corresponding interpolation point (or taught point) is determined; a robot axis position command for providing a position to be determined by shifting the position of interpolation point (or taught point) by the correction amount Δ is issued as a control output; and the position of each axis of robot is controlled via the servo control system, whereby the tracking reflecting the result of sensing over the whole taught path is achieved.

In the above, the descriptions have been made focusing on the processes ranging from the processing and storage of sensed data to the determination of the tracking target point for the taught path segments P1P2 and P2P3. From these descriptions, it may be understood that the processes covering from the processing and storage of sensed data to the determination of the tracking target point for the subsequent taught path segments may be considered in the manner similar to the above-described processes.

Figure 5:
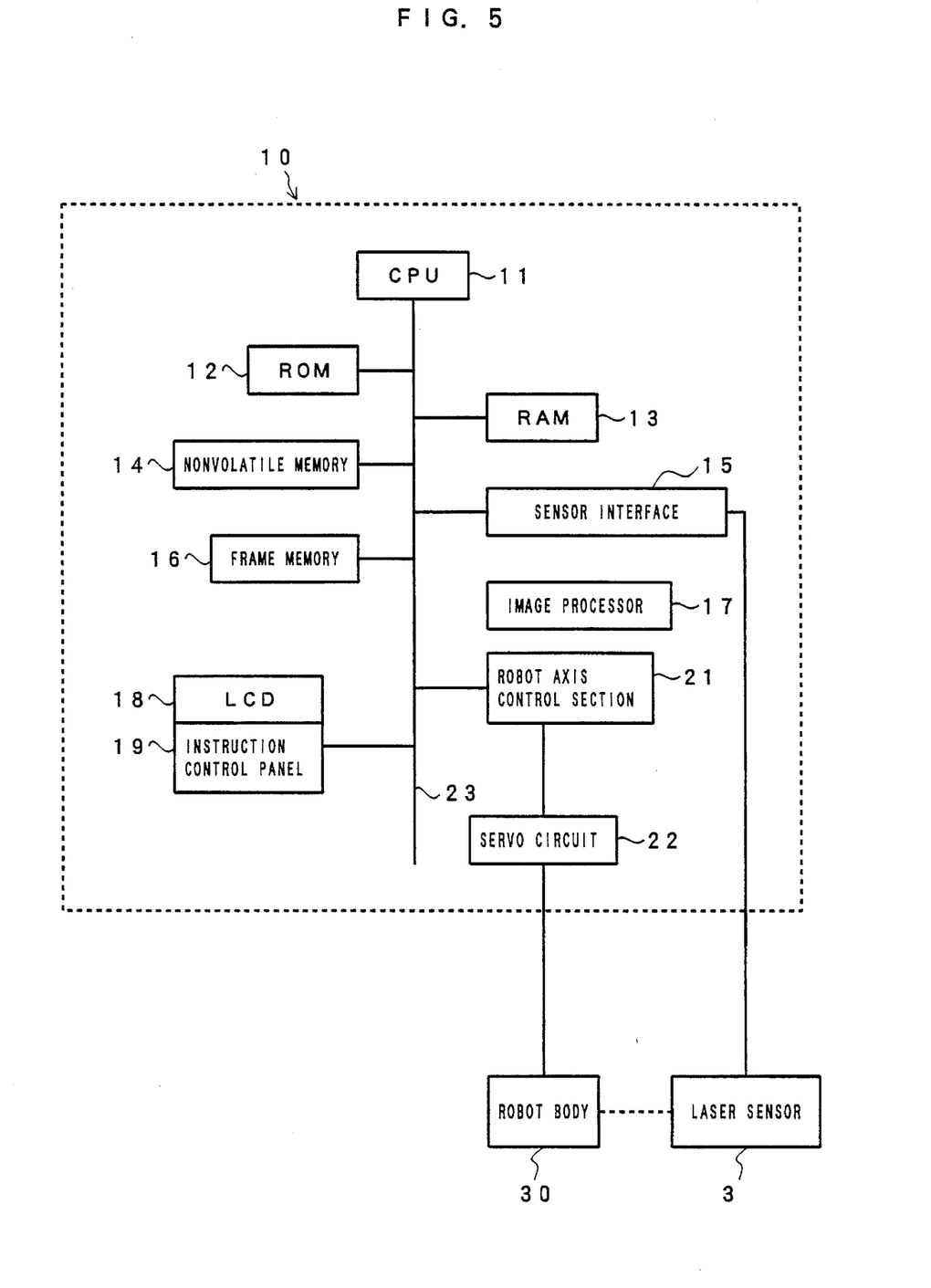
FIG. 5 is a block diagram of principal portion representing one example of control system used for carrying out a method of the present invention.

FIG. 5 is a block diagram showing a principal part of system configuration used for carrying out the control method of the present invention. To describe this block diagram more specifically, a robot controller 10 has a central processing unit (CPU) 11. Connected respectively to the CPU 11 via a bus 23 are a memory 12 consisting of ROM, a memory 13 consisting of RAM, a nonvolatile memory 14, a sensor interface 15 connected to a laser sensor 3, a frame memory 18, an image processing processor 17, a teaching control panel 19 equipped with a liquid crystal display (LCD), and a robot axis control unit 21 connected to a robot body 30 via a servo circuit 22.

The ROM 12 stores various programs by which the CPU 11 carries out the control of the robot body 30, the laser sensor 3, and the robot controller 10 itself. The RAM 13 is used for the temporary storage and calculation of data. The nonvolatile memory 14 is for input and storage of various parameter setting values or teaching programs prepared off-line from the teaching control panel 19 or from off-line program preparing device (not shown). Here, it is assumed that the teaching program corresponding to the taught path, part of which is shown in FIGS. 1 and 2, has already been stored.

The laser sensor 3 is of a known type, and is equipped with a CCD camera supported by the robot hand 1 and having a laser ray source whose deflection scanning irradiation region is shifted towards tool travel direction from the tool tip point 2 and covering the deflection scanning irradiation region. The signal of image captured by the CCD camera, which takes pictures in synchronism with the deflection scanning of laser, is converted into a thick and thin signal by a grey scale via the sensor interface 15, and stored in the frame memory 16. The image information read from the frame memory 16 is processed by the image processing processor 17, and the laser beam specifies the position at which the beam cross the characterized portion such as weld line etc. as the sensing point, thereby acquiring the position data on the sensor coordinate system $\Sigma s$.

If a photoelectric sensor device (for example, a sensor array device of line sensor type), which has a simpler construction than the CCD camera, may be used in measuring the position of weld line, a sensor of such type may be used. If necessary, a monitor CRT for checking the image captured by the CCD camera can be incorporated into the system together with a monitor interface.

The configuration and function described above are basically the same as those of the system having a robot controller for the conventional robot with a sensor. The system of this embodiment, however, particularly has the following features to carry out the method of the present invention.

(1) As part of the memory 13 consisting of RAM, the region of ring memory type buffer memory having the function described in connection with the case illustrated in FIGS. 3 and 4 is provided.

(2) By effectively using the buffer memory, the program for executing the task processing shown in each flowchart of FIGS. 6 and 7, described later, and necessary setting values are stored in the ROM 12 or the nonvolatile memory 14.

Figure 6:
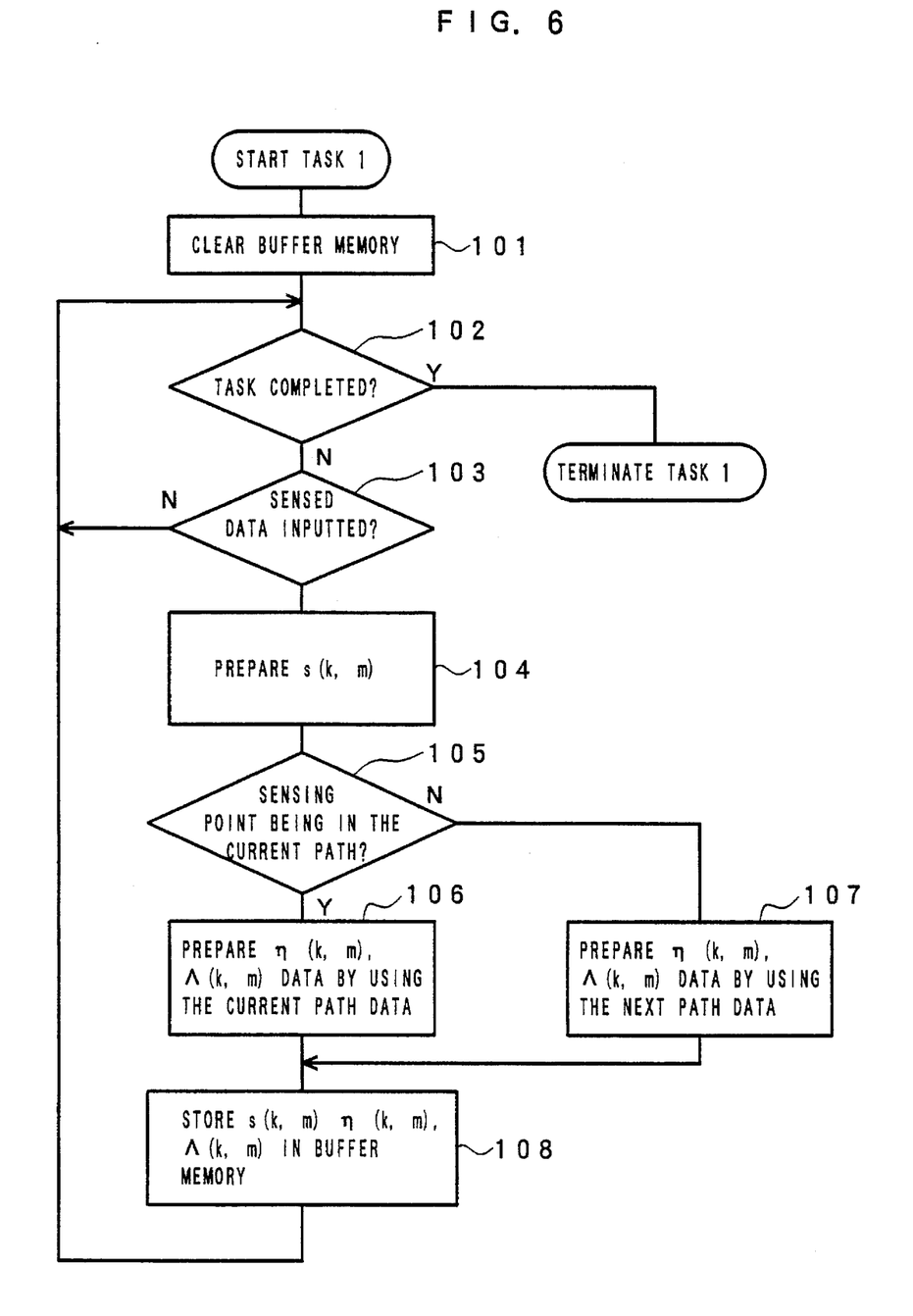
FIG. 6 is a flowchart for task processing 1 which is executed as part of data processing in accordance with the present invention.
Figure 7:
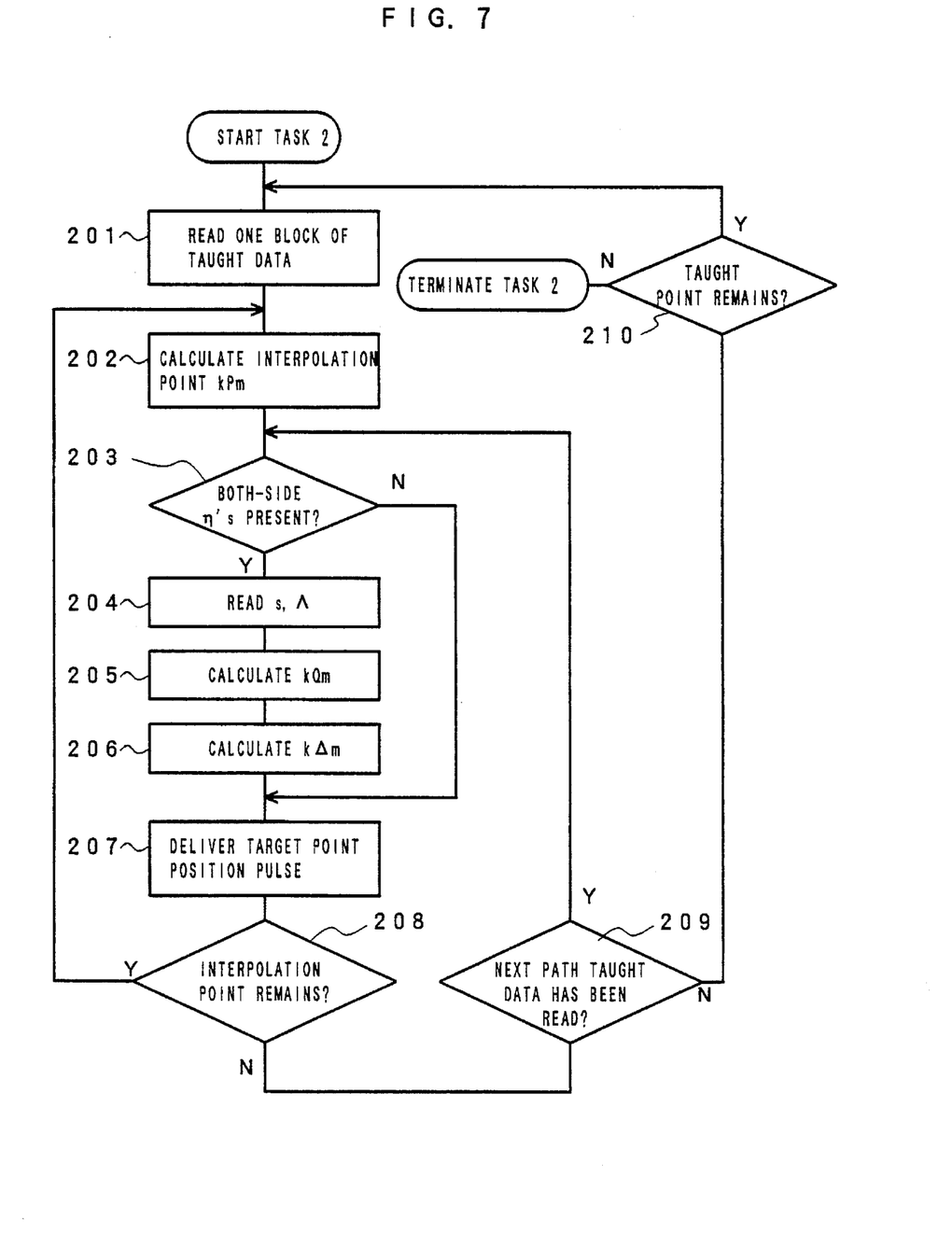
FIG. 7 is a flowchart for task processing 2 which is executed as part of data processing in accordance with the present invention.

FIG. 6 is a flowchart showing the outline of the processing of task 1 for executing a series of processings mainly for the processes ranging from sensing to storage of buffer memory of processes ranging data, which has been described in detail in the section of operation. The outline of the case referred to in FIGS. 1 to 4 will be explained.

When tool movement is started in response to the command inputted from the teaching control panel 19 or the input of external signal, the sensor 3 is activated, and the task 1 start command is issued.

When the task 1 start command is issued once, the CPU 11 clears the data remaining in the buffer memory in Step 101, and makes the buffer memory ready for writing/reading of data. After ascertaining that the task 1 completion command has not been issued in Step 102, the program proceeds to Step 103, and the CPU 11 enters the state of waiting for the acquisition of sensed data by the sensor 3 and the image processing processor 17. Steps 102 and 103 are repeated cyclically unless the CPU 11 detects either the completion command signal or sensed data acquisition signal.

After the tool passes the taught point P1, the sensor 3 detects the weld line, and the sensed data (data on the sensor coordinate system Σs) concerning the first sensed data 1S1 is inputted. Then, the processing goes from Step 103 to Step 104, where the calculation for converting the sensed data into the data s(1, 1) on the work coordinate system Σw is executed by using the current position data of robot and the coordinate conversion matrix data.

At this time, it is judged whether the taught path segment to which the robot tool tip end point belongs (Hereinafter, this taught path segment is called a "current path". The taught path segment which first consists of the current path in this embodiment is the segment P1P2.) coincides with the taught path segment to which the sensing point belongs (Step 105).

This judgment processing can be executed according to the following rule, for example. A perpendicular is drawn from the sensing point to the current path as shown in FIG. 2, and a calculation is executed for solving the equation to determine the intersection on the current path. If the intersection kTm is determined on the current path, it is judged that the sensing point belongs to the current path, and if the intersection kTm cannot be determined (This case can be defined as the case where the position of the intersection of the straight line or circular arc on which the current path lies and the perpendicular deviates from the path connecting the taught points at both ends.), it is judged that the sensing point belongs to the next taught path segment (Hereinafter, this taught path segment is called a "next path". The taught path segment which first consists of the "next path" in this embodiment is the segment P2P3.).

The case in which the latter judgment is made corresponds to the case where, as indicated by B in FIG. 1, the tool tip end point 2a has not entered the region of the next path, while the sensor 3, which is ahead by a distance d, has entered the sensing region corresponding to the next path beyond the taught point to execute the sensing.

When it is judged that the sensing point belongs to the current path, the processed data of the position data s(k, m) is prepared on the basis of the current path data which has already been read. Here, as the processed data, the taught path segment passage factor η(k, m) of the end point kTm (first, k=m=1) of the perpendicular drawn from the sensing point kSm to the current path PkPk+1 and the data ΛΛ(k, m) obtained by aforementioned equation Λ(k, m) are prepared (Step 106).

When the tool is in the state as indicated by position B in FIG. 1, and it is judged that the sensing point belongs to the "next path", the next block of the teaching program is immediately read to calculate the data of the next path, the position of the intersection kTm of the perpendicular drawn from the sensing point and the next path is determined, and the taught path segment passage factor η(k, m) and the data Λ(k, m) obtained by equation are prepared by executing the same calculation as Step 106 (Step 107).

The coordinate data s(k, m) and the processed data η(k, m) and Λ(k, m) prepared in Step 105, Step 106 or Step 107 as described above are immediately stored in the buffer memory in which the storage area is provided in the RAM memory 13. The state of the data storage is as described with reference to FIGS. 3 and 4;the latest data at the time of data storage is written in the last line of the data group in columns 1, 2, and 3, or columns 1, 4, and 5.

After the storage of one set of position data and processed data is completed, the processing returns to Step 102 again. Unless the task processing 1 completion command is issued, the processing from Step 103 to Step 108 are executed repeatedly.

About the time when the tool tip end point passes the last taught point Pn corresponding to the region where the weld line to be sensed is not present, the last buffer memory storage processing is completed, and the task 1 completion command is sent to the CPU 11, which is repeating Steps 102 and 103, to complete the task processing 1.

Next, for the processing of task 2 to be executed in parallel with the processing of task 1, the outline will be described with reference to the flowchart shown in FIG. 7, assuming the same examples as the case of task 1 shown in FIGS. 1 to 4.

When the processing of task 2 is started by the command input from the teaching control panel 19 or the input of external signal, the teaching data for one block is read in Step 201. As seen from FIG. 2, the data read here is the data (the position data of the taught point P1, operation form data, etc.) relating to the path from the tool initial position (not shown, defined as P0) to the first taught point P1.

In the following Step 202, the calculation of the interpolation point kPm is started on the basis of the teaching data which has been read at that time. In Step 202 of the first time, the calculation of the interpolation point 1P1 is first executed on the basis of the data read in Step 201. The "interpolation point calculation" processing in Step 202 generally includes the position calculation of one or several interpolation points and the temporary storage of the result of calculation. Hereinafter, the interpolation point is simply represented by kPm including the case of plural interpolation points, unless specified otherwise. 10 When the position of the interpolation point kPm is determined, in order to determine whether or not the tracking correction process for the interpolation point kPm is necessary, the buffer memory is accessed and it is judged whether or not the taught path segment passage factor η[kPm] (in this embodiment, η[kPm]=m (%)) of the interpolation point kPm is present between the passage factors η of the point T adjacent each other (one of the factors η of the point may agree with the passage factor η[kPm]), which are stored in column 2 or 4 (Step 203).

Referring to the example of FIG. 2, the interpolation points of 1P1 to 1Pi-1 are not present at the position between two T points (end points of perpendicular of sensing point). Therefore, η having the value holding η[kPm] therebetween is not stored in the buffer memory. For example, if i=10, η[1P9]=9%, so that, as described above, the minimum value of η(1, 1) stored in the buffer memory is larger than 9(%). Therefore, it is impossible to find η which satisfy the above conditions for the interpolation point of 1P1 to 1Pi-1. However, the interpolation points after 1Pi are always held between the points T (one of the points T may agree with the point P). Therefore, the corresponding η should be found in the buffer memory.

For the interpolation point at the position close to the next path, one η may lie on the next path; however, this can be judged from the write column position (write position movement between column 2 and column 4) as seen from FIG. 4. Needless to say, the judgment in Step 203 in such a case is YES. Hereinafter, η holding η[kPm] therebetween are referred to as "both-side η's" in any cases.

If both-side η's are not found in the buffer memory for the interpolation point kPm, tracking is regarded as being unnecessary, and the processing for sending out the position pulse of each axis, in which the interpolation point kPm is the target position is executed in accordance with the ordinary process (moving from Step 203 to Step 207).

If the interpolation point kPm is within the tracking requiring region, the coordinate data s of the corresponding sensing point and the processed data Λ are read from the buffer memory in addition to both-side η's (Step 204). In Step 205, the position of the tracking target point kQm is determined on the basis of the read data, interpolation data, etc., and the shift between kQm and kPm, that is, the correction kΔm for the interpolation point kPm is calculated (Step 206). Then, the position command pulse such as to achieve the tool position corresponding to the value obtained by adding the correction kΔm to the position data of the interpolation point kPm is sent out to complete the tracking processing for the interpolation point kPm.

In the subsequent Step 208, it is determined whether there is any interpolation point left on the current path. If it is left, the process returns to Step 202. The processings from Step 202 to Step 208 are repeated in the same way until no remaining interpolation point exists on the current path. In the example shown in FIG. 2, a tool path of ... P1→1P1→ 1P2→. . . →1Pi-1→1Qi→1Qi+1→. . . 1Q98→1Q99 is achieved during this process.

If it is judged in Step 208 that no remaining interpolation point exists, the read condition of the next path data is immediately checked (Step 209). As described in the case of task 1, if a tracking requiring weld line lies in the next path region, the next path data should have been read to calculate the processed data to be stored in the buffer memory. Therefore, unless tracking is completed, the judgment result in Step 209 is YES.

Then, going to Step 203, both-side 72 's are sought from the buffer memory by the same rule as that for the interpolation point for the taught point as the start point of the next path. As seen from FIG. 2, if the weld line extends into the next path region, both-side η's should naturally be found. In this case, it is easily found that both-side η's are stored in the column 2 and the write position switching portion of column 4 or before and after that portion. For example, in the case shown in FIG. 2, both-side η's for the taught point P2 are η(1, r) and η(2, 1) (see FIG. 4).

If both-side η's are not found, it means that the tracking requiring region has been passed. Therefore, the processing goes to Step 207, where the position pulse for the taught point are the target point is sent out in accordance with the ordinary processing.

If both-side η's data are present like P2 in FIG. 2, the processing equivalent to the correction processing for the interpolation point as described above is executed in Steps 204 to 207, thereby obtaining a tool path toward the tracking target point (Q2 corresponding to P2, etc.) corresponding to the taught point. In general, to determine the tracking target point when the tool comes close to the taught path segment boundary during the required tracking, somewhat complex calculation is often required on the basis of the data relating to the sensing point belonging to both new and old paths. The degree of complexity depends on the rule for determining the tracking target point between the sensing points (for example, 1Sr and 2S1), interval of which ranges from new to old taught path segments. For the example of the practicable rule, refer to the method for determining the tracking target point Q2 corresponding to the above-described taught point P2.

After executing the tracking processing corresponding to the taught point as the start point of new taught path segment in Steps 204 to 207, the process returns again from Step 208 to Step 202, and the processings of Steps 202 to 208 are repeated for the interpolation points (2P1, 2P2, 2P3, ... ) of new taught path segment. After the processing of the last interpolation point 2P99 of the taught path segment P2P3 is completed, the processing goes from Step 208 to Step 209, and the above-described processings are repeated again for the start point and the interpolation points of the taught path segment.

When the tool moves on the tracking path, while such processings are executed, to enter a region where weld line is absent, both-side η's cannot be found in the buffer memory in Step 203. Therefore, Steps 204 to 206 will not be executed, so that tool stops tracking and moves on the taught path.

After all of the tracking regions have been passed, in the vicinity of the interpolation point just before the end point of the moving path of the tool, the judgment result in Step 210 is NO, and the processing of task 2 is completed to cause the robot to be stopped.

The above description has been given assuming that the number of weld lines to be tracked is one. However, it may be understood without detailed explanation that the above process can be applied even to the case where a plurality of tracking lines are assumed without requiring any basic changes of the above-described processings including tasks 1 and 2. That is, as long as the processings of task 1 and task 2 are executed continuously, in the region requiring tracking, the data for tracking is successively stored in the buffer memory before the tool movement, and the tracking using this stored data is executed, while in the region requiring no tracking, the storage of data for tracking into the buffer memory is stopped to cause the tracking to be interrupted. Thus, it is evident that the control for enabling automatic switching to the tool movement on the taught path is performed is made available.

In the above description, although both η and Λ have been assumed as the processed data stored in the buffer memory in task 1, only η may be used. Also, improving the processing to be executed just before the execution of tracking by devising various data as the processed data Λ is preferable in making the robot control in accordance with the present invention more effective.

When a circular arc path is included in the taught path, the processing in which not only the data of two new taught points are read into one block data read when the taught path data is acquired is adopted but also a formula for determining the quantity corresponding to the path passage factor on the circular arc path may be used to calculate the passage factor η of point T. It is also possible to introduce algorithm for reflecting the arc center position and the radius of curvature of the taught path into the function to approximately express the tracking line, so that the tracking line can be made smoother.

For example, a method can be used, in which a circular arc function having the same radius of curvature as that of the taught path segment is prepared by using the position data of a plurality of sensing points; the data representing this function is successively stored in the buffer memory as Λ data; and the tracking target point is calculated by using this function.

According to the control method and control apparatus of the present invention, the data obtained by sensing are processed and temporarily stored by utilizing the time margin between the phase in which the sensing data is obtained and the phase in which the tool reaches a point just before the sensed region and the corrected tool target position is determined. The data are processed and stored by using the current path data and also the next path data read in advance when necessary. The temporarily stored data are used just before the execution of position correction to simplify position correction processing. Therefore, the position correction processing immediately following the entry of the tool into the next path is smoothly executed.

Therefore, the real-time tracking of weld line or a robot operation similar to this can be performed accurately throughout the taught path.

Also, since the processed data can be prepared in the state in which there is no severe conditions on the processing amount unlike the case of processing immediately preceding the position correction, relatively complex calculation is allowed to be executed. Therefore, there is a wider latitude in selecting the processes for determining the correcting position, thereby enabling more rationalized more rational data processing in consideration of the type of work, the shape and accuracy of taught path, the tool travel speed, the required smoothness of path, etc.

We claim:

1. A control method for a robot with sensor means, comprising the steps of:
   (a) obtaining sensed data by detecting an operation line position in a region on the travel direction side of a tool supported by a robot;
   (b) converting said sensed data into coordinate data representing said operation line position on a coordinate system set in the robot;
   (c) obtaining processed data by processing said coordinate data converted in said step (b), using data of a taught path segment relating to said region being for detection among path data taught in advance;
   (d) storing said processed data obtained in said step (c) in memory means;
   (e) reading at least part of the data stored in said step (d), and preparing correction data for correcting said taught path, when said tool approaches a point just before said detected operation line position; and
   (f) correcting said taught path data based on said correction data to generate a control output for moving said tool toward a target position.

2. A control method for a robot with sensor means according to claim 1, wherein said step (c) includes a step for executing at least part of calculation required for preparing said correction data based on the coordinate data obtained in said step (b).

3. A control method for a robot with sensor means according to claim 2, wherein said processed data includes a passage factor of a point at which a perpendicular drawn from a point representing said detected operation line position to a straight line defined by the data relating to said taught path segment intersects said straight line within said taught path segment.

4. A control method for a robot with sensor means according to claim 3, wherein said processed data further includes data representing a straight line connecting two adjacent points representing said detected operation line position.

5. A control method for a robot with sensor means according to claim 1, wherein said operation line comprises a weld line, and said step (a) includes a step for detecting a weld line by using said sensor means.

6. A control apparatus for a robot, comprising:

sensor means for detecting an operation line position in a region on the travel direction side of a tool supported by a robot to obtain sensed data;

means for converting said sensed data into coordinate data representing said operation line position on a coordinate system set on the robot;

processing means for processing said converted coordinate data, using data of a taught path segment relating to said region for detection among taught path data taught in advance;

memory means for storing said processed data;

means for reading at least part of the data stored in said memory means and preparing correction data for correcting said taught path when said tool approaches a point just before said detected operation line position; and means for correcting said taught path data based on said correction data to generate a control output for moving said tool toward a target position.

7. A control apparatus for a robot according to claim 1, wherein said processing means executes at least part of calculation required for preparing said correction data based on said coordinate data.

8. A control apparatus for a robot according to claim 7, wherein said processed data includes a passage factor of a point at which a perpendicular drawn from a point representing said operation line position to a straight line defined by the data relating to said taught path segment intersects said straight line within said taught path segment.

9. A control apparatus for a robot according to claim 8, wherein said processed data further includes data representing a straight line connecting two adjacent points representing said operation line position.

10. A control apparatus for a robot according to claim 6, wherein said operation line comprises a weld line, and said sensor means detects said weld line.

* * * * *

UNITED STATES PATENT AND TRADEMARK OFFICE
CERTIFICATE OF CORRECTION

PATENT NO. : 5,467,003
DATED : November 14, 1995
INVENTOR(S) : KOSAKA et al.

It is certified that error appears in the above-indentified patent and that said Letters Patent is hereby corrected as shown below:

Col. 1, line 29, delete extra spaces.
Col 2, line 50, change "Weld" to --weld--;
      line 56, after "buffer" delete ".".
Col. 3, line 24, delete extra spaces.
Col. 8, line 48, change "A" to --$\lambda$--.
Col. 10, line 4, change "18" to --16--.
Col. 11, line 52, delete "A".
Col. 12, line 38, delete "10".
Col. 13, line 36, change "72's" to --$\eta$'s--.

Signed and Sealed this

Twentieth Day of February, 1996

Attest:

BRUCE LEHMAN

*Attesting Officer*     *Commissioner of Patents and Trademarks*